(No Model.)
J. W. RICHARDSON.
SELF HOLDING SCREW DRIVER.
No. 332,438. Patented Dec. 15, 1885.
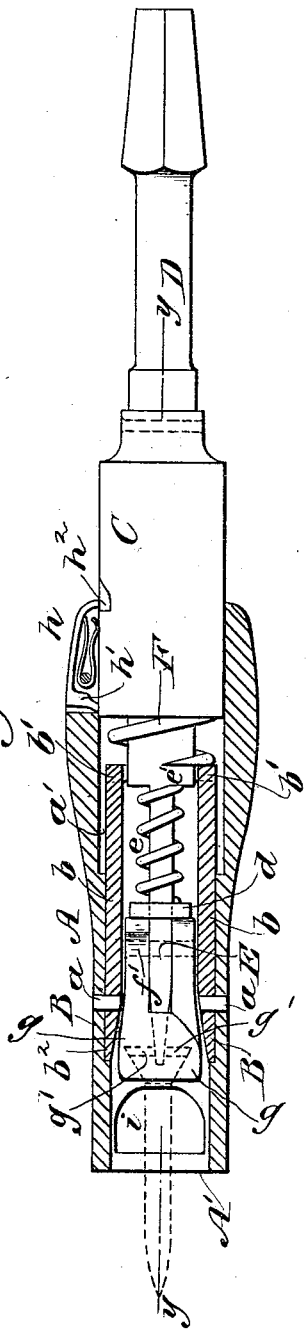
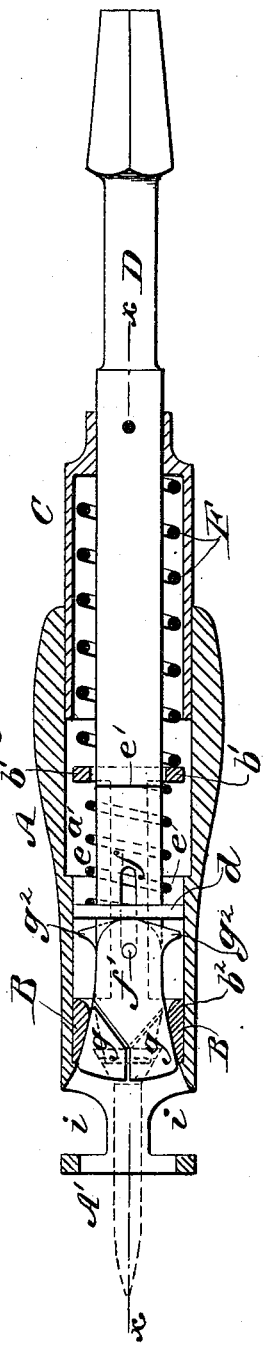
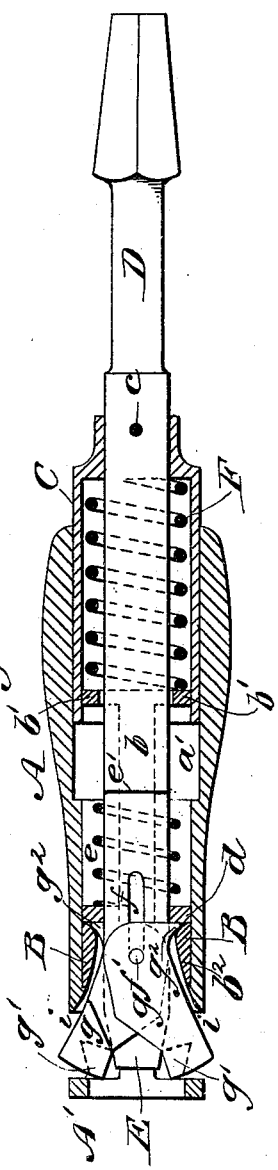
WITNESSES:
INVENTOR:
J. W. Richardson
BY Munn & Co.
ATTORNEYS.

UNITED STATES PATENT OFFICE.

JOHN W. RICHARDSON, OF PARK CITY, UTAH TERRITORY.

SELF-HOLDING SCREW-DRIVER.

SPECIFICATION forming part of Letters Patent No. 332,438, dated December 15, 1885.

Application filed April 17, 1885. Serial No. 162,505. (No model.)

*To all whom it may concern:*

Be it known that I, JOHN W. RICHARDSON, of Park City, in the county of Summit and Territory of Utah, have invented a new and Improved Self-Holding Screw-Driver, of which the following is a full, clear, and exact description.

The object of this invention is to provide a practical screw-driver provided with jaws for holding the screw to be inserted; and the invention consists of the construction, arrangement, and combination of parts, all as hereinafter described and claimed.

Reference is to be had to the accompanying drawings, forming part of this specification, in which similar letters of reference indicate corresponding parts in all the figures.

Figure 1 is a longitudinal sectional elevation of my new and improved screw-driver, showing the parts in the position they assume at the time of holding a screw ready for starting it, a screw being shown in dotted lines held by the jaws, the section being taken on the line $x\ x$ of Fig. 2. Fig. 2 is a similar view taken on the line $y\ y$ of Fig. 1, and Fig. 3 is a longitudinal sectional elevation of the screw-driver, showing the parts thereof in the position they assume at the time the jaws are opened for receiving and releasing the screw.

A represents an outer shell or casing, in which is secured by the pins $a\ a$ the skeleton piece B, which is formed with the side pieces, $b\ b$, and the upper ring, $b'$. The shell A is enlarged at $a'$ to receive the inner shell, C, which is attached by the pin $c$ to the spindle D. To the inner end of the spindle D is secured the screw-driving blade E. The spindle D and blade E are held centrally in the outer shell, A, the former by being passed through the above-mentioned ring $b'$, the latter by being passed through the ring $d$, which is oblong in form to fit the flat formation of the blade, as will be understood from Figs. 1 and 2. The outer ends of the ring $d$ run against the inner surface of the outer shell, A, and the ring is adapted to move with the blade E from the position shown in Fig. 1 to that shown in Fig. 3, where it is stopped by coming against the lower ring portion, $b^2$, of the skeleton B, so that farther downward movement of the blade E and spindle D will be against the action of the coiled oblong spring $e$, placed upon the blade E, the shoulders $e'$ of the spindle D coming against the spring, as shown in Fig. 1. The blade E has the slot $f$ made through it near its sharp or outer end, and attached to the blade by the pin $f'$, that passes through the slot $f$, are the jaws $g\ g$, which hinge upon the said pin $f'$, and open and close in opposite directions for grasping and releasing the head of the screw. The adjacent faces of the jaws $g\ g$ are correspondingly recessed, as shown in dotted lines at $g'$, to fit the heads of screws. The inner ends of the jaws at their outer edges are provided with projections $g^2\ g^2$, that are adapted, when the spindle D and blade E are forced downward, to strike against the inner edge of the ring $b^2$, for opening the jaws $b\ b$, as illustrated in Fig. 3.

When the spindle D and blade E are forced downward and the jaws opened, they may be held in such position by the nose $h'$ of the spring-actuated trigger $h$ entering the recess $h^2$, made in the shell C. (Shown in Fig. 1.) In the inner shell, C, is placed upon the spindle D the coiled spring F, which acts between the closed end of the shell and the ring $b'$ of the skeleton B, so that when the spindle D is forced downward the spring F will be compressed to react upon the spindle D and blade E for closing the jaws $g\ g$—that is, for drawing them back within the main casing from the position shown in Fig. 3 to that shown in Figs. 1 and 2, causing the jaws to be closed by their outer edges coming against the walls of the lower end of the casing A, and lower ring, $b^2$, of the skeleton B. The lower end of the main outer casing, A, has the side openings, $i\ i$, formed in it to permit the jaws $g\ g$ to open, as shown in Fig. 3.

In use, to place a screw in the screw-driver, the spindle D will be forced into the casing A, until the trigger $h$ drops into the notch $h^2$. This movement of the spindle will force the blade E down and jaws $g\ g$ outward, and cause the projection $g^2$ to open the jaws. The head of the screw will then be placed between the jaws $g\ g$, and the rear end of the trigger $h$ will then be pressed downward, which will release the shell C and spindle D, whereupon the springs $e$ F will act to return the spindle D, blade E, and jaws $g\ g$, the shell A being moved forward, and to cause the jaws to close upon the head of the screw, as above described, and thus hold it in contact with the sharp end of the blade E, so that the screw may be placed, started, and driven home without further handling of the screw with the hands, and without starting it with a hammer, as is the practice with common screw-drivers.

In driving the screw the end or ring A' of the main outer casing, A, will strike the board or other object in which the screw is being forced before the screw is driven home. Then, as the screw enters, the spindle D, blade E, inner casing, C, and jaws $g\ g$ will follow the screw, while the outer casing, A, and skeleton B will remain at rest—that is, they will have only a rotary motion. When the spindle, inner casing, and the jaws reach the position shown in Fig. 3, the jaws will open and release the head of the screw. Then, owing to the slot $f$, made in the blade E, the spindle D and blade E will move longitudinally independently of the jaws until the screw is driven entirely home. Pressure now being removed from the spindle D, the springs $e$ F will react to return all of the parts of the screw-driver to their original positions. If the screw is driven beyond the surface, pressure being released the parts C F E will slack back until the trigger comes into notch $h^2$, the jaws standing wide open to clamp another screw when trigger is depressed. If screw is driven just below the surface, the back action will be slight, the jaws simply standing ready to clamp another screw when trigger is pressed.

Having thus described my invention, what I claim as new, and desire to secure by Letters Patent, is—

1. The combination, with an outer casing, A, having a spring-catch, $h$, and an interior skeleton frame, B, having side pieces, $b\ b$, and upper ring, $b'$, of the spring-operated spindle D, passed through ring $b'$, and provided with a slotted blade, E, the ring $d$ on the blade and guided between the arms $b\ b$, and the jaws $g$, pivoted to the blade, the pivot passing through the slot thereof, substantially as set forth.

2. In a screw-driver, the outer casing, A, having the skeleton frame B, rounded at $b^2$, the spindle D, the blade E, slotted at $f$, and the jaws $g\ g$, pivoted at the slotted portion the blade and having projections $g^2$ on their inner ends constructed to engage the rounded parts $b^2$ of the skeleton $B^2$, substantially as and for the purpose set forth.

3. The combination, with the outer casing, A, having the ring A' at its lower end, the openings $i$, adjacent thereto, the spring-catch $h$, and the skeleton having arms $b\ b$ and upper ring, $b'$, of the inner casing, C, the spindle D, the spring F on the spindle D, resting against the ring $b'$ and the upper end of the casing C, the blade E on the lower end of the spindle and provided with the slot $f$, the jaws $g$, pivoted by the pin $f'$, extending through the slot $f$, the sliding guide-ring D on the blade above and in contact with the inner ends of the jaws, and the spring $e$ on the blade between the rings $d\ b'$, substantially as set forth.

JOHN W. RICHARDSON.

Witnesses:
J. F. RICHARDSON,
JOS. M. COHEN.